US012519703B2

(12) United States Patent
Pashkov et al.

(10) Patent No.: US 12,519,703 B2
(45) Date of Patent: Jan. 6, 2026

(54) INTUITIVE NETWORK MANAGEMENT USER INTERFACE

(71) Applicant: Acronis International GmbH, Schaffhausen (CH)

(72) Inventors: Georgy Pashkov, Sofia (BG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 49 days.

(21) Appl. No.: 18/732,844

(22) Filed: Jun. 4, 2024

(65) Prior Publication Data

US 2024/0422074 A1 Dec. 19, 2024

Related U.S. Application Data

(60) Provisional application No. 63/508,176, filed on Jun. 14, 2023.

(51) Int. Cl.
| | |
|---|---|
| *G06F 15/16* | (2006.01) |
| *H04L 12/46* | (2006.01) |
| *H04L 41/12* | (2022.01) |
| *H04L 41/22* | (2022.01) |

(52) U.S. Cl.
CPC .......... *H04L 41/22* (2013.01); *H04L 12/4633* (2013.01); *H04L 41/12* (2013.01)

(58) Field of Classification Search
CPC ...... H04L 12/4633; H04L 41/12; H04L 41/22
USPC ....................................................... 709/223
See application file for complete search history.

(56) References Cited

U.S. PATENT DOCUMENTS

| | | | | |
|---|---|---|---|---|
| 9,225,661 | B1* | 12/2015 | Yang | G06F 9/5077 |
| 11,159,383 | B1* | 10/2021 | Cherkas | H04L 43/0876 |
| 11,356,344 | B2* | 6/2022 | Cherkas | H04L 41/122 |
| 11,385,775 | B2* | 7/2022 | Singh | G06F 9/451 |
| 11,658,890 | B1* | 5/2023 | Cherkas | H04L 67/1097 |
| | | | | 709/204 |
| 11,671,337 | B2* | 6/2023 | Cherkas | H04L 41/12 |
| | | | | 709/201 |
| 11,695,661 | B1* | 7/2023 | Cherkas | H04L 43/028 |
| | | | | 709/223 |
| 12,192,245 | B2* | 1/2025 | Bhat | H04L 63/0435 |
| 12,206,562 | B2* | 1/2025 | Cherkas | H04L 12/66 |

(Continued)

*Primary Examiner* — Moustafa M Meky
(74) *Attorney, Agent, or Firm* — ArentFox Schiff LLP; Michael Fainberg (57) ABSTRACT

Disclosed herein are systems and methods for generating an intuitive network management user interface (UI). A method includes: receiving network information of at least one client network and at least one cloud network, wherein the network information includes a network identifier of each device within a given network, a status of the given network, network policies associated with the given network; determining a plurality of connections between the at least one client network and the at least one cloud network based on the network information; generating, for display, the network management UI including a three-column graphical structure wherein a first column includes first visualized information of the at least one client network, a second column includes second visualized information of the plurality of connections, and a third column includes third visualized information of the at least one cloud network.

20 Claims, 8 Drawing Sheets

(56) References Cited

U.S. PATENT DOCUMENTS

| | | | | |
|---|---|---|---|---|
| 12,255,793 | B2* | 3/2025 | Cherkas | H04L 43/08 |
| 12,348,378 | B2* | 7/2025 | Zheng | H04L 67/10 |
| 2016/0380832 | A1* | 12/2016 | Purushotham | H04L 41/12 |
| | | | | 709/226 |
| 2019/0268233 | A1* | 8/2019 | Singh | G06Q 10/06393 |
| 2021/0328875 | A1* | 10/2021 | Cherkas | H04L 12/66 |
| 2021/0328876 | A1* | 10/2021 | Cherkas | H04L 41/12 |
| 2021/0328883 | A1* | 10/2021 | Cherkas | H04L 41/12 |
| 2021/0342049 | A1* | 11/2021 | Singh | G06F 9/452 |
| 2022/0385538 | A1* | 12/2022 | Jeuk | H04L 67/1001 |
| 2023/0362076 | A1* | 11/2023 | Cherkas | H04L 67/1097 |
| 2024/0095813 | A1* | 3/2024 | Adogla | G06Q 30/0603 |
| 2024/0098073 | A1* | 3/2024 | Adogla | G06Q 30/018 |
| 2024/0098089 | A1* | 3/2024 | Adogla | G06F 9/45558 |
| 2024/0250990 | A1* | 7/2024 | Bhat | H04L 63/0435 |

* cited by examiner

INTUITIVE NETWORK MANAGEMENT USER INTERFACE

CROSS-REFERENCE TO RELATED APPLICATIONS

This application claims the benefit of U.S. Provisional Application No. 63/508,176, filed Jun. 14, 2023, which is herein incorporated by reference.

FIELD OF TECHNOLOGY

The present disclosure relates to the field of network management, and, more specifically, to network management user interfaces.

BACKGROUND

Conventional user interfaces that depict network topologies often fail to provide user friendly management of the network. They either lack features that involve creating, modifying, or ending connections, or hide features to prevent intuitive access. They also fail to depict important information that is relevant to the user. There thus exists a need to improve network management user interfaces and allow for efficient access to network information.

SUMMARY

In one exemplary aspect, the techniques described herein relate to a method for generating an intuitive network management user interface (UI), the method including: receiving network information of at least one client network and at least one cloud network, wherein the network information includes a network identifier of each device within a given network, a status of the given network, network policies associated with the given network; determining a plurality of connections between the at least one client network and the at least one cloud network based on the network information; generating, for display, the network management UI including a three-column graphical structure wherein a first column includes first visualized information of the at least one client network, a second column includes second visualized information of the plurality of connections, and a third column includes third visualized information of the at least one cloud network; wherein the first visualized information and the third visualized information includes visualizations of the network information of at least one client network and at least one cloud network, and wherein the second visualized information includes lines, extending from the first column to the third column, that represent each network connection between a device in the at least one client network and a device in the at least one cloud network; receiving, on the network management UI, a selection to modify the at least one client network, the at least one cloud network, or the plurality of connections; and transmitting a command to the at least one client network and/or the at least one cloud network to execute the selection.

In some aspects, the techniques described herein relate to a method, wherein receiving the network information includes: installing, on the at least one client network and the at least one cloud network, at least one virtual agent configured to monitor internal and external network connections and generate the network information.

In some aspects, the techniques described herein relate to a method, wherein the selection to modify includes a selection to create a new network and reassign devices in an existing network of the at least one client network or the at least one cloud network to the new network.

In some aspects, the techniques described herein relate to a method, wherein the selection to modify includes creating a virtual private network (VPN) tunnel, wherein the VPN tunnel is associated with one of site-to-site open VPN and multi-site IPsec VPN.

In some aspects, the techniques described herein relate to a method, wherein the selection to modify includes performing automatic network mapping, wherein when a network is created on the at least one client network with an IP address that corresponds to the at least one cloud network, the command includes automatically performing tunneling.

In some aspects, the techniques described herein relate to a method, wherein the selection to modify includes adding a virtual network to the at least one cloud network and stretching the virtual network to the at least one client network.

In some aspects, the techniques described herein relate to a method, wherein the selection to modify includes changing a parameter in one of the first visualized information, the second visualized information, and the third visualization information.

In some aspects, the techniques described herein relate to a method, further including: generating an icon on each of the lines of the second column, wherein the icon indicates a status of a respective connection between a device in the at least one client network and a device in the at least one cloud network; receiving a selection of a first icon in the second column; and generating a dialog window that indicates additional information about a first connection associated with the first icon.

In some aspects, the techniques described herein relate to a method, wherein an appearance of the icon differs based on whether the respective connection is successful or has errors.

In some aspects, the techniques described herein relate to a method, wherein the second visualized information includes an icon that indicates an amount of the network policies that are active for a given connection.

It should be noted that the methods described above may be implemented in a system comprising a hardware processor. Alternatively, the methods may be implemented using computer executable instructions of a non-transitory computer readable medium.

In some aspects, the techniques described herein relate to a system for generating an intuitive network management user interface (UI), the system including: at least one memory; and at least one hardware processor coupled with the at least one memory and configured, individually or in combination, to: receive network information of at least one client network and at least one cloud network, wherein the network information includes a network identifier of each device within a given network, a status of the given network, network policies associated with the given network; determine a plurality of connections between the at least one client network and the at least one cloud network based on the network information; generate, for display, the network management UI including a three-column graphical structure wherein a first column includes first visualized information of the at least one client network, a second column includes second visualized information of the plurality of connections, and a third column includes third visualized information of the at least one cloud network; wherein the first visualized information and the third visualized information includes visualizations of the network information of at least one client network and at least one cloud network, and wherein the second visualized information includes lines, extending from the first column to the third column, that represent each network connection between a device in the at least one client network and a device in the at least one cloud network; receive, on the network management UI, a selection to modify the at least one client network, the at least one cloud network, or the plurality of connections; and transmit a command to the at least one client network and/or the at least one cloud network to execute the selection.

In some aspects, the techniques described herein relate to a non-transitory computer readable medium storing thereon computer executable instructions for generating an intuitive network management user interface (UI), including instructions for: receiving network information of at least one client network and at least one cloud network, wherein the network information includes a network identifier of each device within a given network, a status of the given network, network policies associated with the given network; determining a plurality of connections between the at least one client network and the at least one cloud network based on the network information; generating, for display, the network management UI including a three-column graphical structure wherein a first column includes first visualized information of the at least one client network, a second column includes second visualized information of the plurality of connections, and a third column includes third visualized information of the at least one cloud network; wherein the first visualized information and the third visualized information includes visualizations of the network information of at least one client network and at least one cloud network, and wherein the second visualized information includes lines, extending from the first column to the third column, that represent each network connection between a device in the at least one client network and a device in the at least one cloud network; receiving, on the network management UI, a selection to modify the at least one client network, the at least one cloud network, or the plurality of connections; and transmitting a command to the at least one client network and/or the at least one cloud network to execute the selection.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for generating an intuitive network management user interface. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The user interface described in the present disclosure improves computer technology, particularly in centralized network management between a client and a cloud by enabling the tracking of resource states on both ends of the connection. The user interface allows for efficient network management by utilizing information about resource states on both the client and cloud sides of the connection.

In general, the present disclosure relates to the creation of a visual representation of network switching, which provides the ability to interactively manage topology components. For example, the visual representation allows a user to quickly assess the connection status, types of connections, networks, switching components, and resources within the networks. In some aspects, the visual representation of network switching is an intuitive graphical interface that helps reduce time spent on configuring and managing network infrastructure. Through the use of the user interface, one achieves a more efficient use of network resources and increased performance of the entire network infrastructure.

Figure 1A:
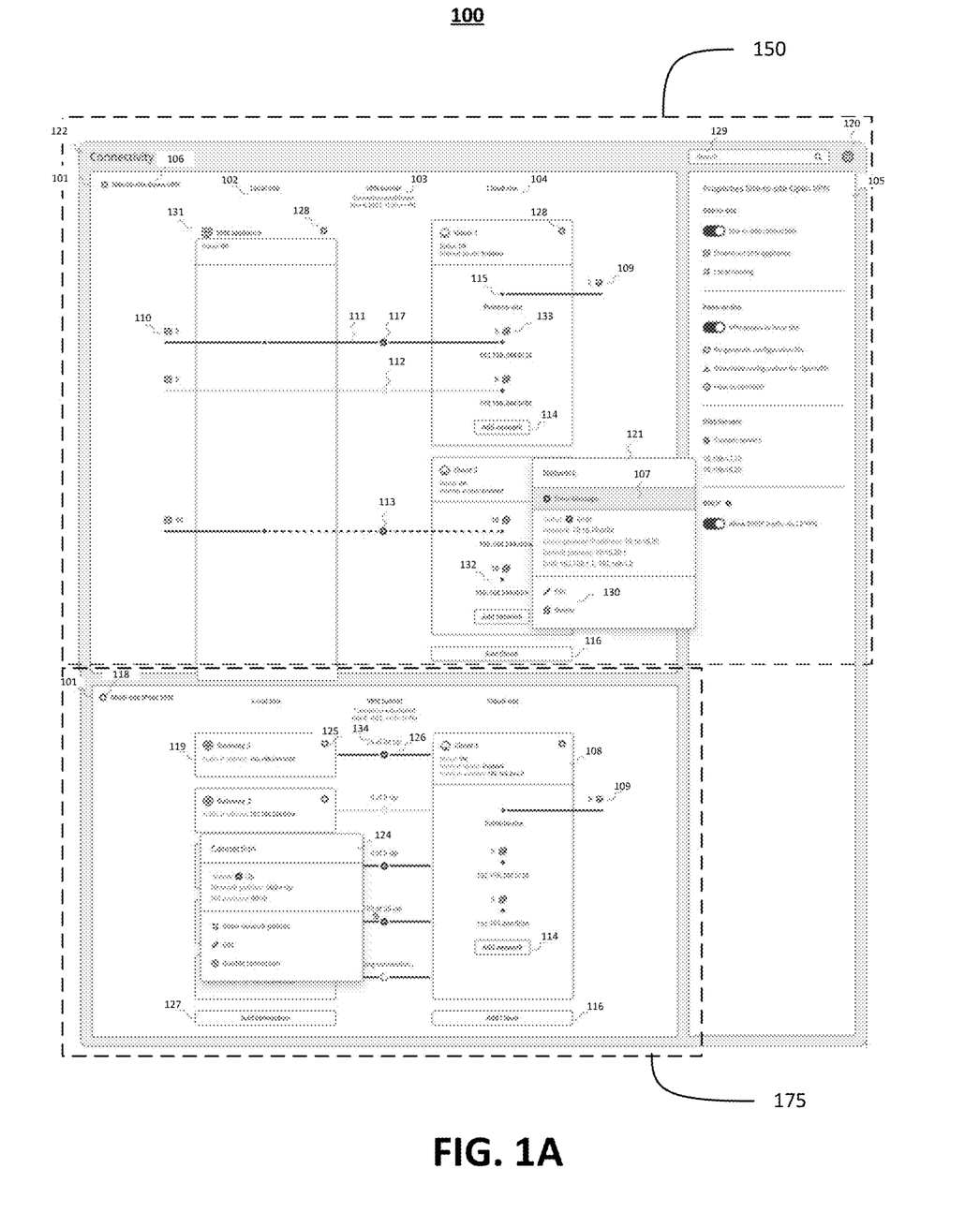
FIG. 1A is an example of a network management user interface.

FIG. 1A is an example of a network management user interface 100. There are two portions of user interface 100, a first portion 150 and a second portion 175. These portions are identified for easier readability in the figures. More specifically, FIG. 1B depicts the first portion 150 of the network management user interface 100 and FIG. 1C depicts the second portion 175 of the network management user interface 100.

The main interface window 122 of the application includes a plurality of control areas. The plurality of control areas includes a topology display area 101, a properties area 105, a network switching settings icon 120, and an object name search field 129. Display area 101 is divided into three columns. The first column is local site 102, the second column is connections 103, and the third column is cloud site 104. Furthermore, display area 101 has two sub-windows: sub-window 106 and sub-window 118. Sub-window 106 is labelled as site-to-site open virtual private network (VPN) and sub-window 118 is labelled as multi-site IPsec VPN.

Figure 1B:
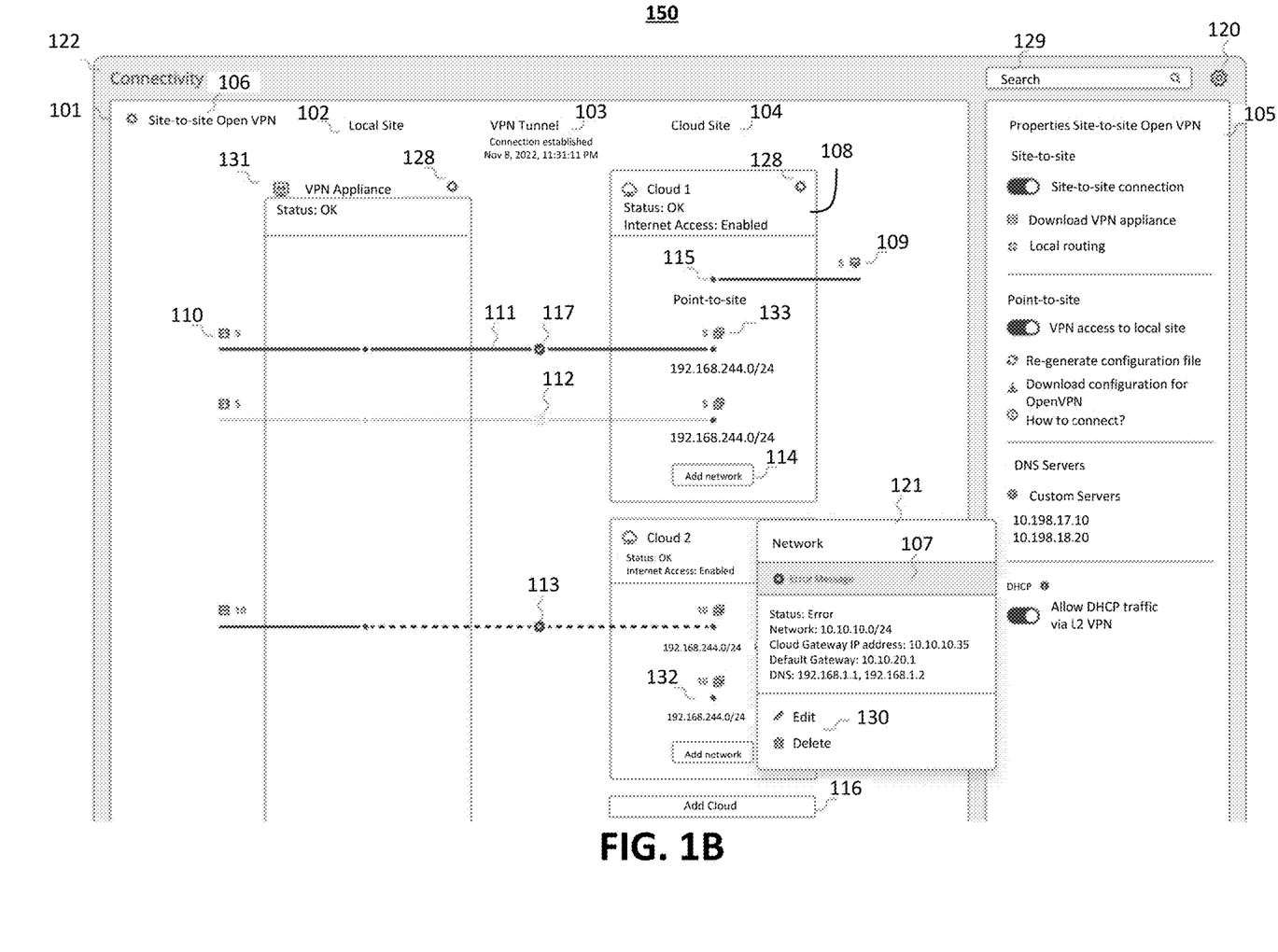
FIG. 1B is a first portion of the network management user interface.
Figure 1C:
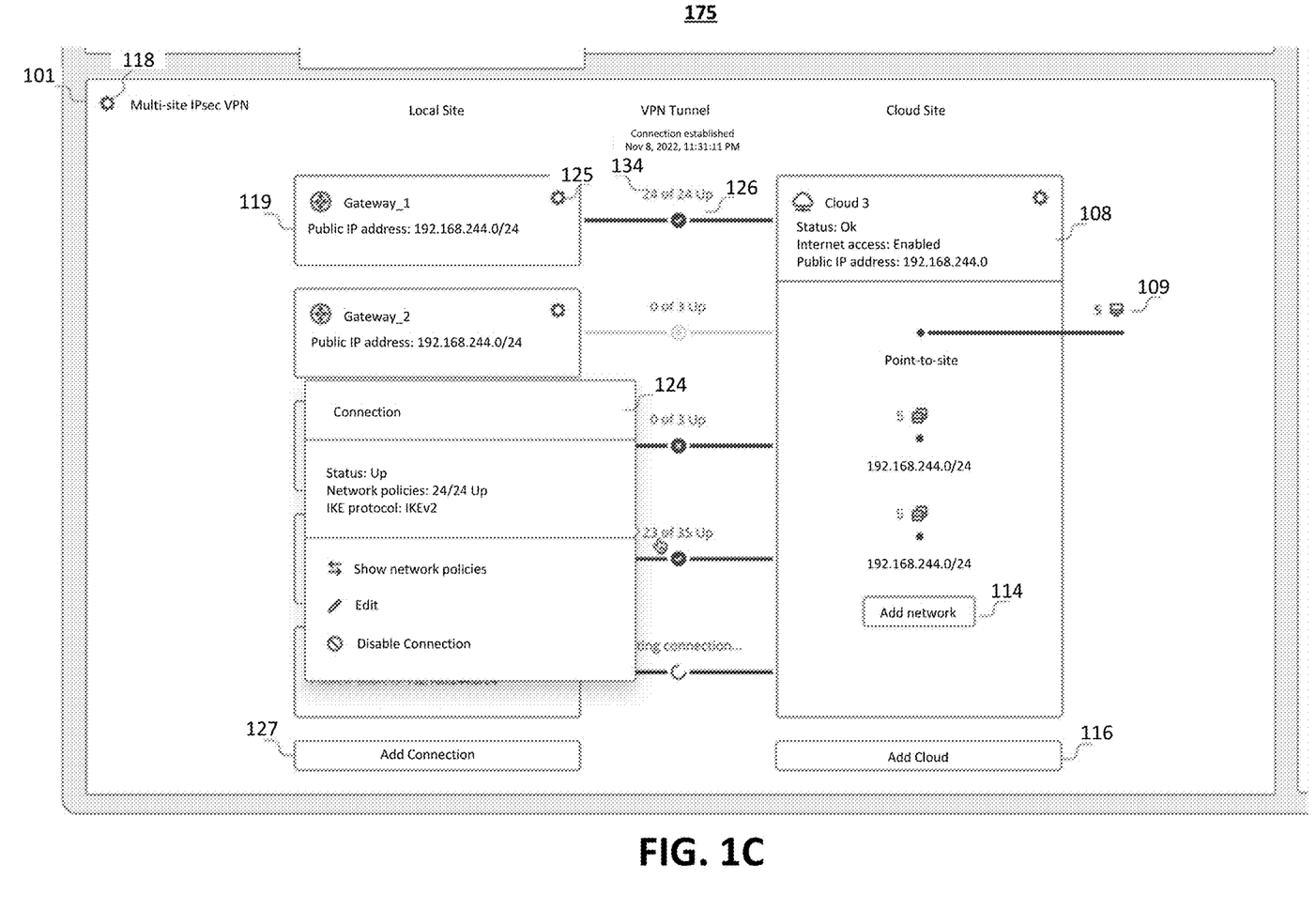
FIG. 1C is a first portion of the network management user interface.

In the example provided in FIG. 1A-1B, in sub-window 106, local site 102 includes a virtual private network (VPN) appliance server 131 located on the client side, and cloud site 104 includes cloud 1 and cloud 2. In sub-window 118, local site 102 includes gateway_1, gateway_2, ..., gateway_N, and cloud site 104 includes cloud 3.

Settings icon 128 of VPN appliance server 131 opens a dialog with detailed device parameters, settings, and actions.

In the example, connections 103 depicts a VPN tunnel connecting local site 102 with cloud site 104 and provides information about the connection status, with network connection statuses (117, 113, 112) located in the vertical area. For example, status 117 describes a successful connection between the VPN appliance server 131 and cloud 1, while status 13 includes an unsuccessful connection between the VPN appliance server 131 and cloud 2. The visualization of the connection segment depends on the network status.

The third column is cloud site 104, which includes cloud infrastructure block 108 or multiple blocks depending on the scale of the infrastructure, and a button 116 to add new cloud infrastructure. The cloud infrastructure block 108 in each block at the top includes an area for displaying statuses and additional parameters, as well as an icon 128 to open a dialog with detailed infrastructure parameters, settings, and actions. In the central part of the block, network lines 111 are located with the button 114 to add new networks. There is a separate line pointing to the right indicating a point-to-site connection 115.

Network lines 111 include horizontal line(s) connecting the local site 102 including VPN appliance server 131 with cloud site 104 including cloud infrastructure block 108. The network name is listed in the form of its IP address at the right end. Clicking on the network name opens a dialog 121 with the main network parameters, settings, and actions. An icon with the number of cloud servers 133 is located above the IP address. At the left end of the network in the VPN appliance server 131 area, there is an icon with the number of local servers 110 on the client side.

Clicking on the icon indicating the number of cloud servers 133 opens a dialog with cloud server settings for the selected networks. Clicking on the icon indicating the number of local servers 110 opens a dialog box with the settings for the local servers within the selected network.

Dialog 121 with network parameters includes information about the network, displays possible error messages 107 and actions 130 on the network. For example, in FIGS. 1A and 1B, error message 107 indicates an error on network 10.10.10.0/24. In some aspects, the exact error may be also listed (e.g., disconnection, shutdown, incorrect IP address, lack of credentials, etc.).

The point-to-site connection 115 is located in the cloud infrastructure block 108 as a line extending to the right, showing the number of connections 109. Clicking on point-to-site connection 115 opens a dialog with detailed information about the connections.

In terms of Multi-site IPsec VPN, gateways 119 are switching devices on the client side. For example, gateway_1 is connected to cloud 3 via connection 126. On connection 126 exists an indication of network policies 134 (e.g., 24 of 24 Up). Selecting connection 126 opens a dialog 124 with policy settings.

The properties area 105 allows the user to access the settings of the selected type of network communication, depending on the selected type: Site-to-site Open VPN, Multi-site IPsec VPN, or other types of network switching. For example, a user may download configuration information or enable/disable site-to-site connections. In some aspects, a user may enable or disable VPN access to local site via properties area 105. In some aspects, a user may allow or disable DHCP traffic via L2 VPN through properties area 105.

It should be noted that users may interact with the user interface in various ways beyond traditional button clicking. For example, a user can employ gesture recognition on touch-sensitive screens, executing actions like swiping, tapping, or pinching. Voice commands offer a hands-free approach, allowing users to speak commands to select items or navigate through menus. Keyboard shortcuts provide a quick way to make selections using predefined key combinations, while mouse gestures enable users to perform specific movements to trigger actions. Touchpad gestures (e.g., on laptops) offer similar functionality to mouse gestures. Advanced interfaces may utilize eye-tracking technology or motion sensors to detect users' eye movements or body gestures for selections. In gaming or virtual reality environments, motion sensors and joystick or controller inputs allow users to interact with the user interface through physical movements or button presses. These alternative methods enhance accessibility and user experience by catering to diverse preferences and capabilities.

Figure 2:
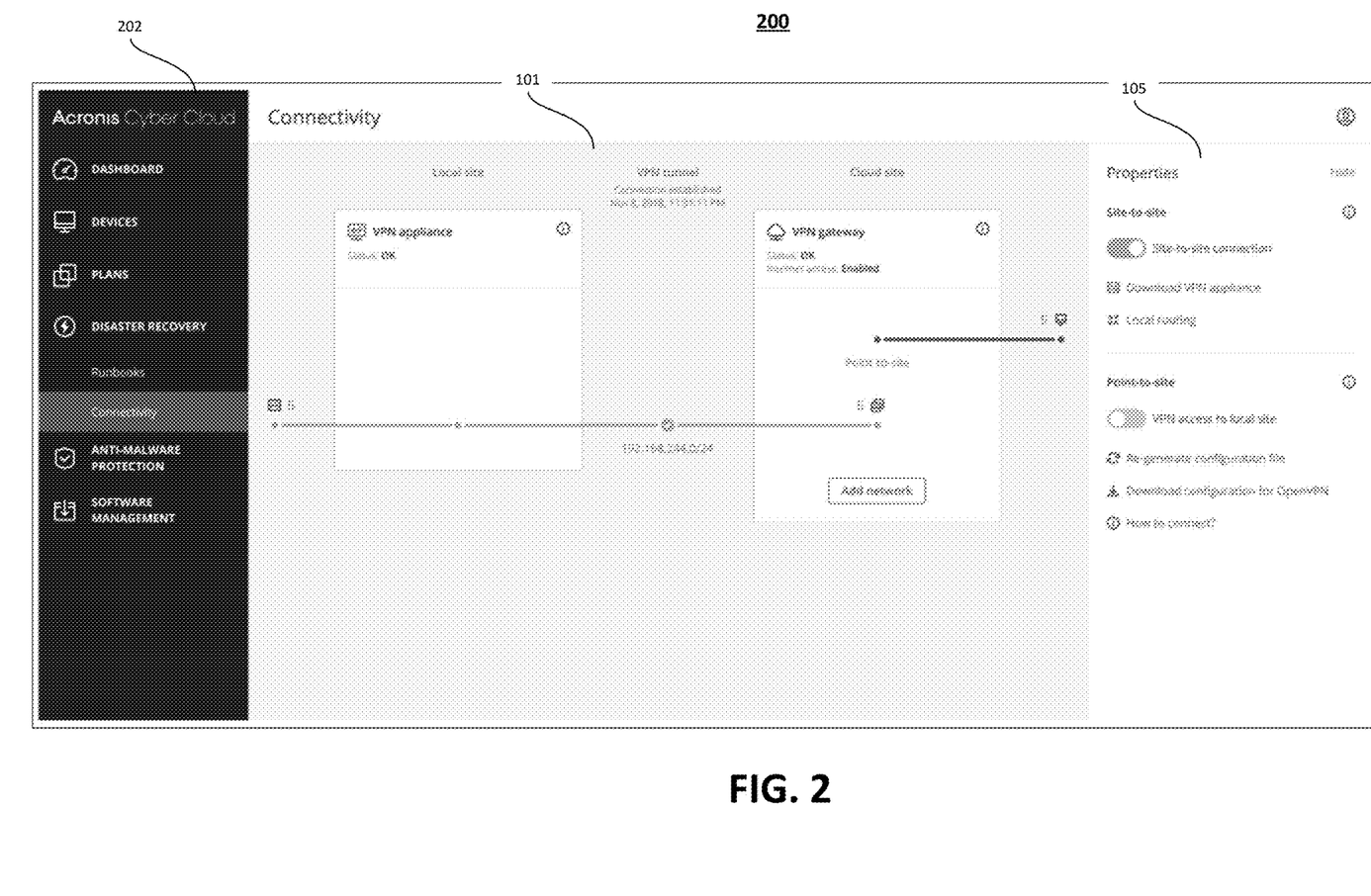
FIG. 2 is a first view of the network management user interface in a network application.

FIG. 2 is a first view 200 of the network management user interface 100 in a network application. First view 200 is comparable to the first portion 150 in that it includes display area 101 and properties area 105. The functionality and capabilities of those areas are the same as those described in FIGS. 1A-1C. First view 200 includes menu 202, which includes options such as "Dashboard," which depicts the view shown in FIG. 1A, "Devices," which lists the individual devices in the network(s), "Plans," which includes a list of network management plans employed in a network, "Disaster Recovery," which includes options for backing up and running recovery on different devices of a network, "Anti-malware Protection," which includes options for scanning the devices in the network for viruses and malicious activity, and "Software Management," which enables users to update, add, or remove software in the devices throughout the network.

Figure 3:
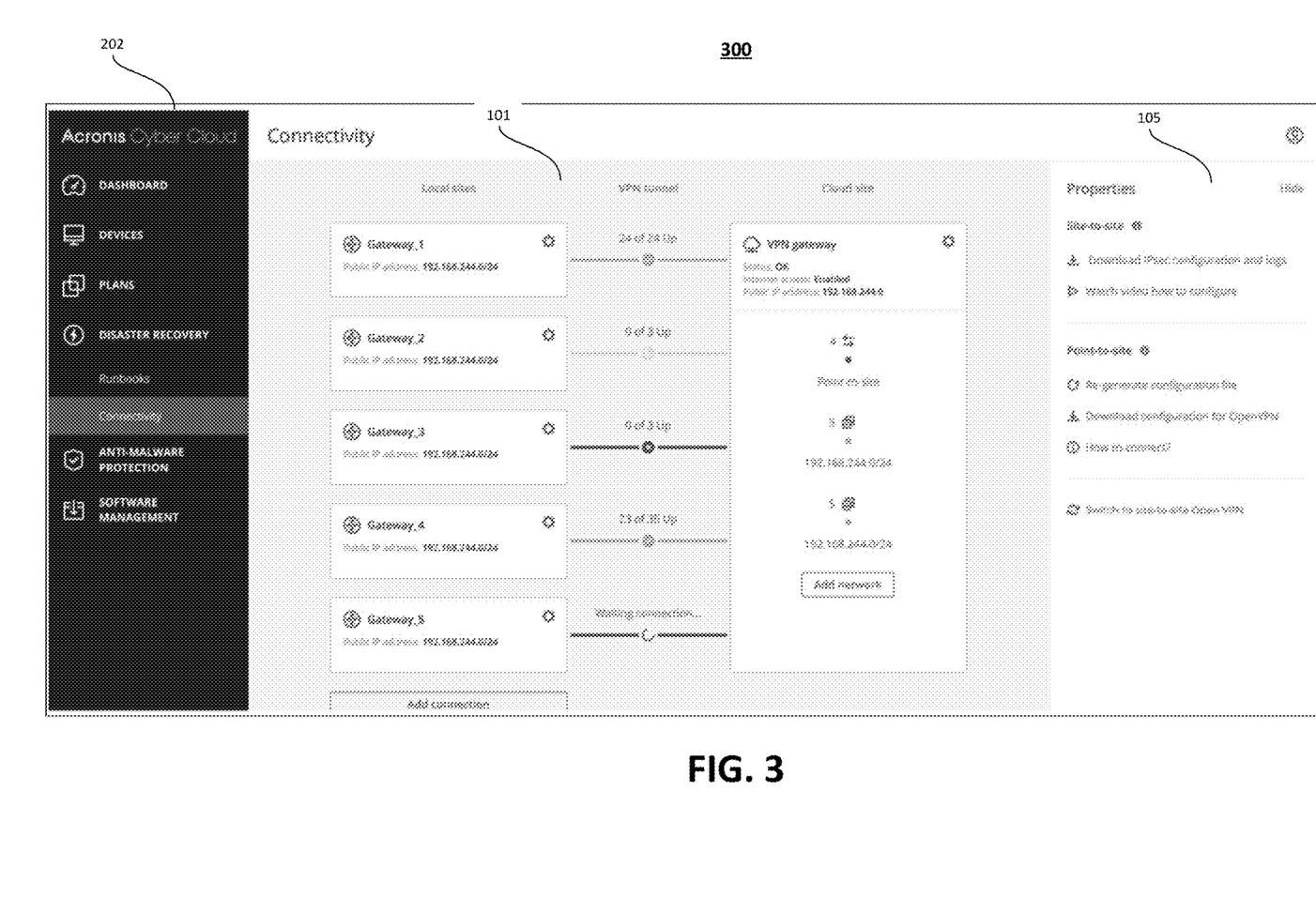
FIG. 3 is a second view of the network management user interface in a network application.

FIG. 3 is a second view 300 of the network management user interface 100 in a network application. The second view 300 is comparable to the second portion 175 in that it includes display area 101 and properties area 105. In some aspects, the user may utilize second view 300 to perform disaster recovery. The method of representing network topology through network management user interface 100 provides a convenient and understandable way to visualize network topology. Unlike existing interfaces that present network topology in the form of tables, network management user interface 100 uses a graphical interface that makes it easy to understand the structure and connections of devices in the network. As a result, network management is improved in terms of convenience and efficiency, and network administrator performance is enhanced. This is because an improved interface and method for visualizing network topology provides users with the ability to solve network issues directly based on graphical visualization of network topology and network infrastructure management tools. An important feature of this interface is the ability to manage resources within the network (in terms of connectivity), including reassigning IP addresses of devices directly from the topology interface. This interface also provides the ability to monitor networks from multiple cloud infrastructures with different types of connections, which ensures convenience and efficiency in managing distributed network resources.

Figure 4:
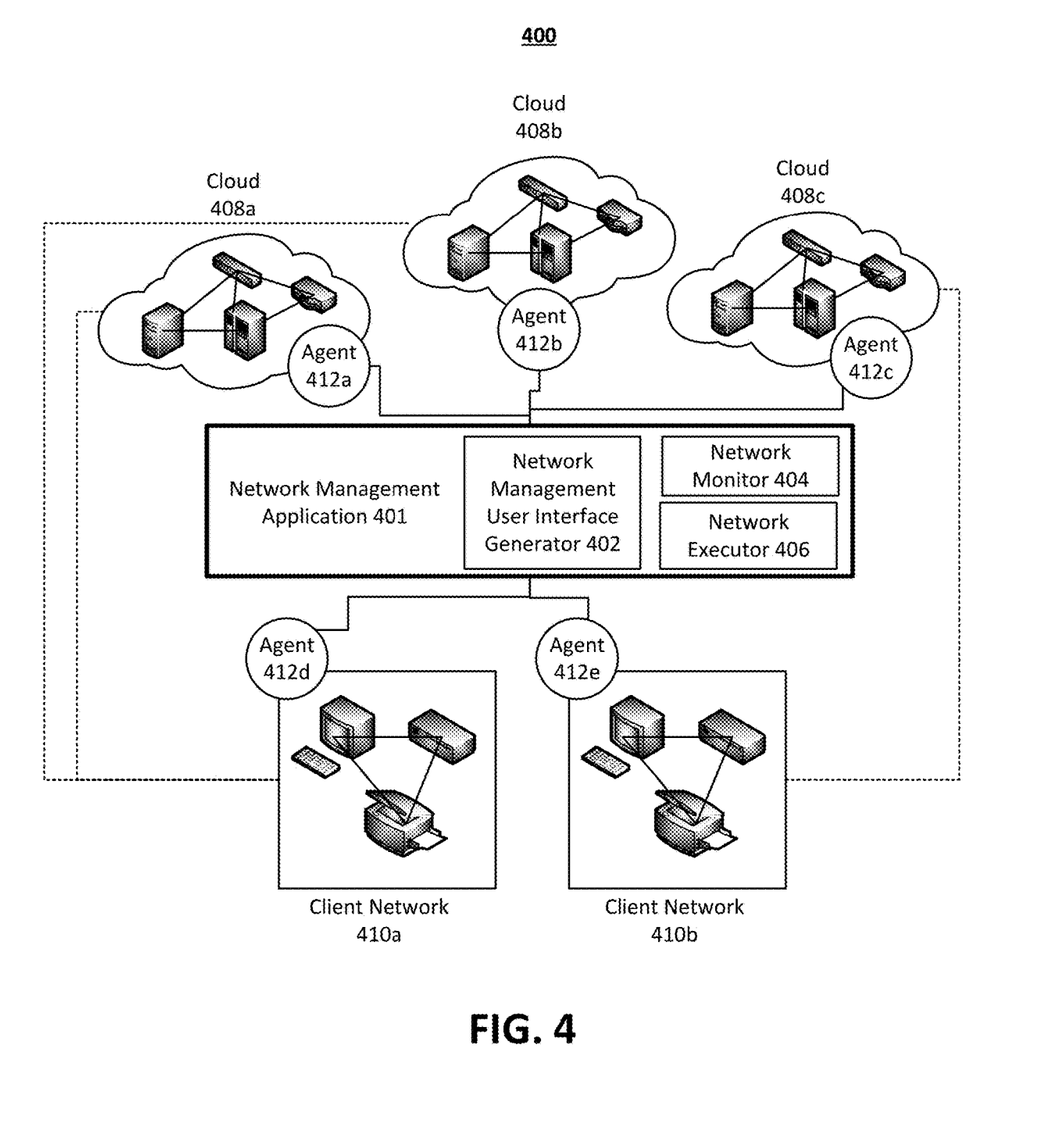
FIG. 4 is a block diagram illustrating a system for generating an intuitive network management user interface.

FIG. 4 is a block diagram illustrating a system 400 for generating an intuitive network management user interface. System 400 includes network management application 401 that is made up of user interface generator 402, network monitor 404, and network executor 406. These three components may reside on a central server that receives information, transmits commands, and generates network management user interface 100. In some aspects, a user may access the user interface 100 generated by network management user interface generator 402 from a computing device. For example, the user may install a thin application of network management user interface generator 402 such that the thin application only receives information from network monitor 404 and executes network commands using network executor 406.

Consider an example in which there exists cloud networks 408a, 408b, and 408c and client networks 410a and 410b. For simplicity only a limited number of networks is shown in FIG. 4, but one skilled in the art will appreciate that there may be any number of networks and each of the networks may be connected to one another. Each of these networks may include a plurality of devices (e.g., servers, routers, switches, etc.).

In some aspects, remote installation of virtual agents 412a, 412b, 412c, 412d, and 412e may be performed on the networks, which provides additional flexibility and convenience in configuring and managing the network. For example, agents 412 may expand network management capabilities and allow for effective control and management of all components of the network infrastructure, including servers, switching devices, and other network elements. In particular, network monitor 404 may collect information using virtual agents installed at different ends of the network that provide information about the state of the network and its components.

Based on the network information received by network monitor 404, network management user interface generator 402 generates user interface 100, which provides information and allows the user to execute commands and modify the networks. In some aspects, user interface 100 provides full network management functionality and problem-solving capabilities, including resolving IP address mismatches across different ends of the network and notifying users of issues with virtual devices and switches. The user interface 100 may, for example, provide the following features: (1) creating VPN tunnels with different types of connections, including Site-to-Site Open VPN and Multi-Site IPsec VPN, (2) adding virtual networks to the cloud infrastructure and stretching them to the client infrastructure, (3) automatic network mapping, (4) adding multiple cloud and client infrastructures, and (5) managing network parameters of endpoint devices in different network segments. In terms of automatic network mapping, when a network is created on the client side with an IP address that corresponds to the cloud infrastructure, the system automatically performs tunneling.

When a user makes a selection on user interface 100 to add/change parameters of a network, network executor 406 receives the command and executes it. For example, if a user requests to change an IP address of a device in client network 410b via user interface 100, network executor 406 generates and transmits a command to execute the request to client network 410b. If the command is successfully implemented, the change should be detected by network monitor 404 within a threshold period of time. In some cases, the changes may be realized immediately and thus the user interface 100 updates (e.g., shows the new IP address) immediately after the selection. In some cases, the changes may take time to realize, and thus the user interface 100 may generate a dialog that indicates an estimated until the selection is executed successfully. For example, after the user has requested for a change, user interface 100 may generate an icon that, when clicked, opens a dialog box with the message "being updated-please wait." In some aspects, the dialog box may also provide a time by when the update is expected to be complete (e.g., update completion estimate: in 2 min).

Network management user interface 100 may be used for disaster recovery and backup. However, its potential for use with various types of connections is much broader. Corporate VPN networks and dedicated high-speed lines are some additional usage examples. More specifically, network management user interface 100 may be utilized within corporate environments where VPNs are employed. VPNs are commonly used by organizations to provide secure remote access for employees working from external locations or for connecting multiple office locations over the internet in a secure manner. Network management user interface 100 may be used to assist in managing the configuration, monitoring, and optimization of these VPN connections. In terms of dedicated high-speed lines, network management user interface 100 may also be used in scenarios where organizations have dedicated, high-speed internet connections. These connections typically offer consistent and reliable performance, often used for mission-critical applications or where high bandwidth is required. Network management user interface 100 may be used to assist in managing these connections, ensuring that they are optimized for performance, and monitoring their status to address any issues promptly.

In the field of disaster recovery, for example, this interface may be used to switch between the primary and backup servers, as well as to provide secure access to the backup servers from the client side.

As mentioned previously, network management user interface 100 may include features for network monitoring and analysis, providing real-time insights into network performance, traffic patterns, and potential issues for troubleshooting and optimization. Users may further utilize network management user interface 100 to manage Quality of Service parameters, ensuring optimal performance and prioritization of network traffic for critical applications or services.

Users can employ network management user interface 100 to configure and manage network security policies, such as firewall rules, intrusion detection/prevention systems, and access controls, to enhance network security posture. Network management user interface 100 may enable users to allocate and manage bandwidth resources effectively, ensuring equitable distribution among users or applications to prevent congestion and bottlenecks. For environments utilizing virtualization technologies, network management user interface 100 allows for the management of virtual networks, including provisioning, configuration, and monitoring of virtual network components.

Organizations with multiple locations can utilize network management user interface 100 to establish and manage connectivity between sites, enabling seamless communication and data exchange across distributed networks. Network management user interface 100 may also be used for compliance management and reporting, assisting organizations in adhering to regulatory requirements and industry standards by monitoring and documenting network activity and configurations.

Figure 5:
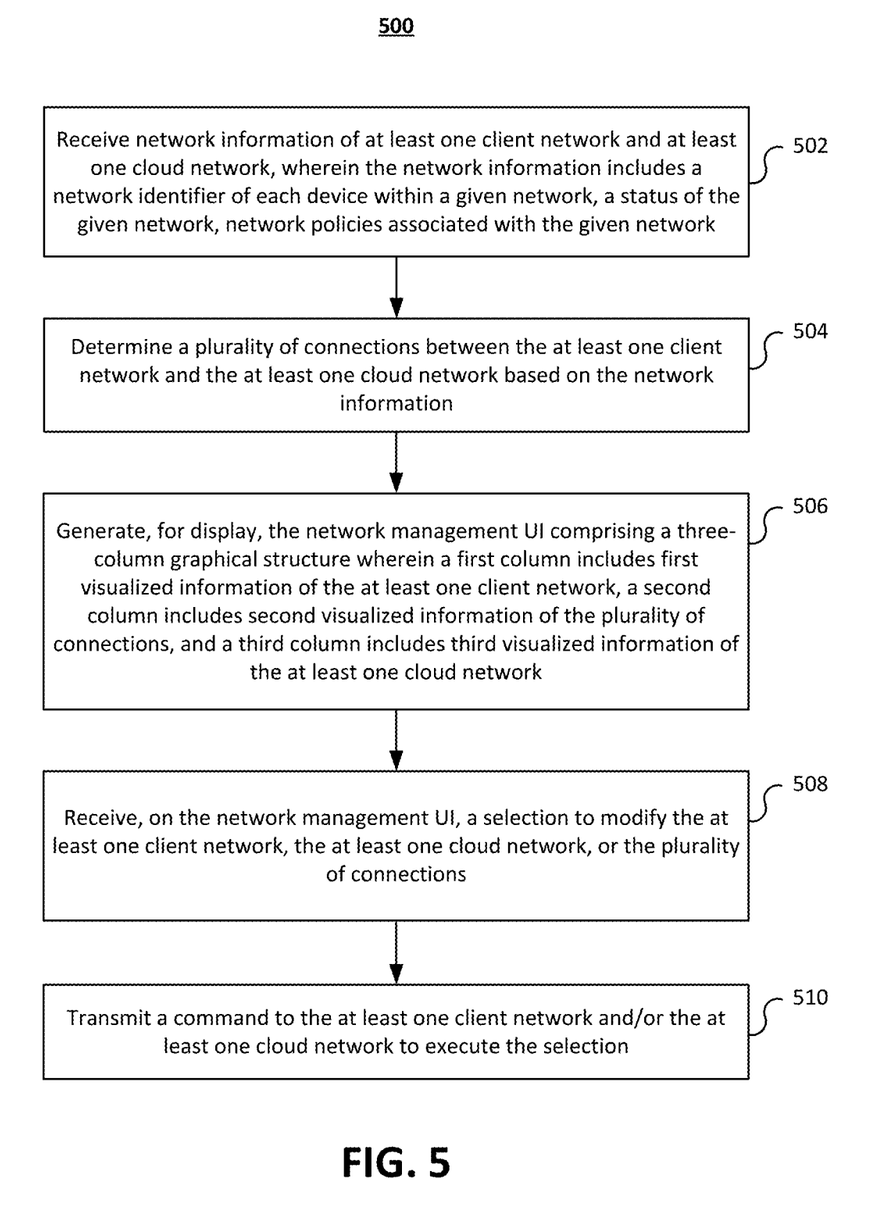
FIG. 5 illustrates a flow diagram of a method for generating an intuitive network management user interface.

FIG. 5 illustrates a flow diagram of method 500 for generating an intuitive network management user interface. At 502, network monitor 404 of network management application 401 receives network information of at least one client network (e.g., client networks 410*a* and 410*b*) and at least one cloud network (e.g., cloud networks 408*a*, 408*b*, and 408*c*). In some aspects, the network information includes a network identifier of each device within a given network (e.g., network address, IP address, MAC address, etc.), a status of the given network (e.g., active, error, disabled, restarting, updating, etc.), network policies associated with the given network.

In some aspects, network management application 401 may install, on the at least one client network and the at least one cloud network, at least one virtual agent configured to monitor internal and external network connections and generate the network information. For example, agent 412*a* may be installed on one or more devices of cloud network 408*a*, agent 412*b* may be installed on one or more devices of cloud network 408*b*, agent 412*c* may be installed on one or more devices of cloud network 408*c*, agent 412*d* may be installed on one or more devices of client network 410*a*, and agent 412*e* may be installed on one or more devices of client network 410*b*. The respective virtual agents may identify the different devices in each network, determine the total number of devices in each network, determine device status, etc.

At 504, network monitor 404 of network management application 401 determines a plurality of connections between the at least one client network and the at least one cloud network based on the network information. For example, network monitor 404 may determine that a device in client network 410*a* is connected to a device in cloud network 408*a*.

At 506, user interface generator 402 of network management application 401 may generate, for display, the network management UI (e.g., user interface 100) comprising a three-column graphical structure wherein a first column includes first visualized information of the at least one client network, a second column includes second visualized information of the plurality of connections, and a third column includes third visualized information of the at least one cloud network. For example, the first column corresponds to local site 102, the second column corresponds to connections 103, and the third column corresponds to cloud site 104. Suppose that client network 410*a* includes a VPN appliance server described in FIG. 1B and that cloud network 408*a* corresponds to Cloud 1 and cloud network 408*b* corresponds to Cloud 2 of FIG. 1B. Network monitor 404 may determine that five devices in client network 410*a* are connected to five devices in cloud network 408*a*.

In an exemplary aspect, the first visualized information and the third visualized information includes visualizations of the network information of at least one client network and at least one cloud network, and the second visualized information includes lines, extending from the first column to the third column, that represent each network connection between a device in the at least one client network and a device in the at least one cloud network. For example, user interface 100 includes network lines 111 that connect devices in the VPN appliance server to cloud 1.

In some aspects, network management application 401 may generate an icon (e.g., status 117) on each of the lines 111 of the second column. The icon may indicate a status of a respective connection between a device in the at least one client network and a device in the at least one cloud network. In some aspects, an appearance of the icon differs based on whether the respective connection is successful or has errors. For example, the connection between devices associated with the VPN appliance server and cloud 1 in FIG. 1 are successful, whereas there is a connection error between devices associated with other devices associated with VPN appliance server and cloud 2 (e.g., cloud network 408*b*).

In some aspects, network management application 401 may receive a selection of a first icon in the second column (e.g., status 113) and generate a dialog window (e.g., dialog 121) that indicates additional information about a first connection associated with the first icon.

In some aspects, the second visualized information includes an icon that indicates an amount of the network policies (e.g., network policies 134) that are active for a given connection (e.g., connection 126).

In an exemplary aspect, at 508, network management application 401 receives, on the network management UI, a selection to modify the at least one client network, the at least one cloud network, or the plurality of connections. For example, in some aspects, selection to modify comprises a selection (e.g., select button 114) to create a new network and reassign devices in an existing network of the at least one client network or the at least one cloud network to the new network.

In some aspects, the selection to modify comprises creating a virtual private network (VPN) tunnel, wherein the VPN tunnel is associated with one of site-to-site open VPN and multi-site IPsec VPN.

In some aspects, the selection to modify comprises performing automatic network mapping, wherein when a network is created on the at least one client network with an IP address that corresponds to the at least one cloud network, the command comprises automatically performing tunneling.

In some aspects, the selection to modify comprises adding a virtual network to the at least one cloud network and stretching the virtual network to the at least one client network.

In some aspects, selection to modify comprises changing a parameter in one of the first visualized information, the second visualized information, and the third visualization information.

At 510, network executor 406 of network management application 401 transmits a command to the at least one client network and/or the at least one cloud network to execute the selection. For example, a new virtual network may be requested for creation. Network executor 406 receives the request and executes the creation so that it can be monitored by network monitor 404 and subsequently visualized on user interface 100.

Figure 6:
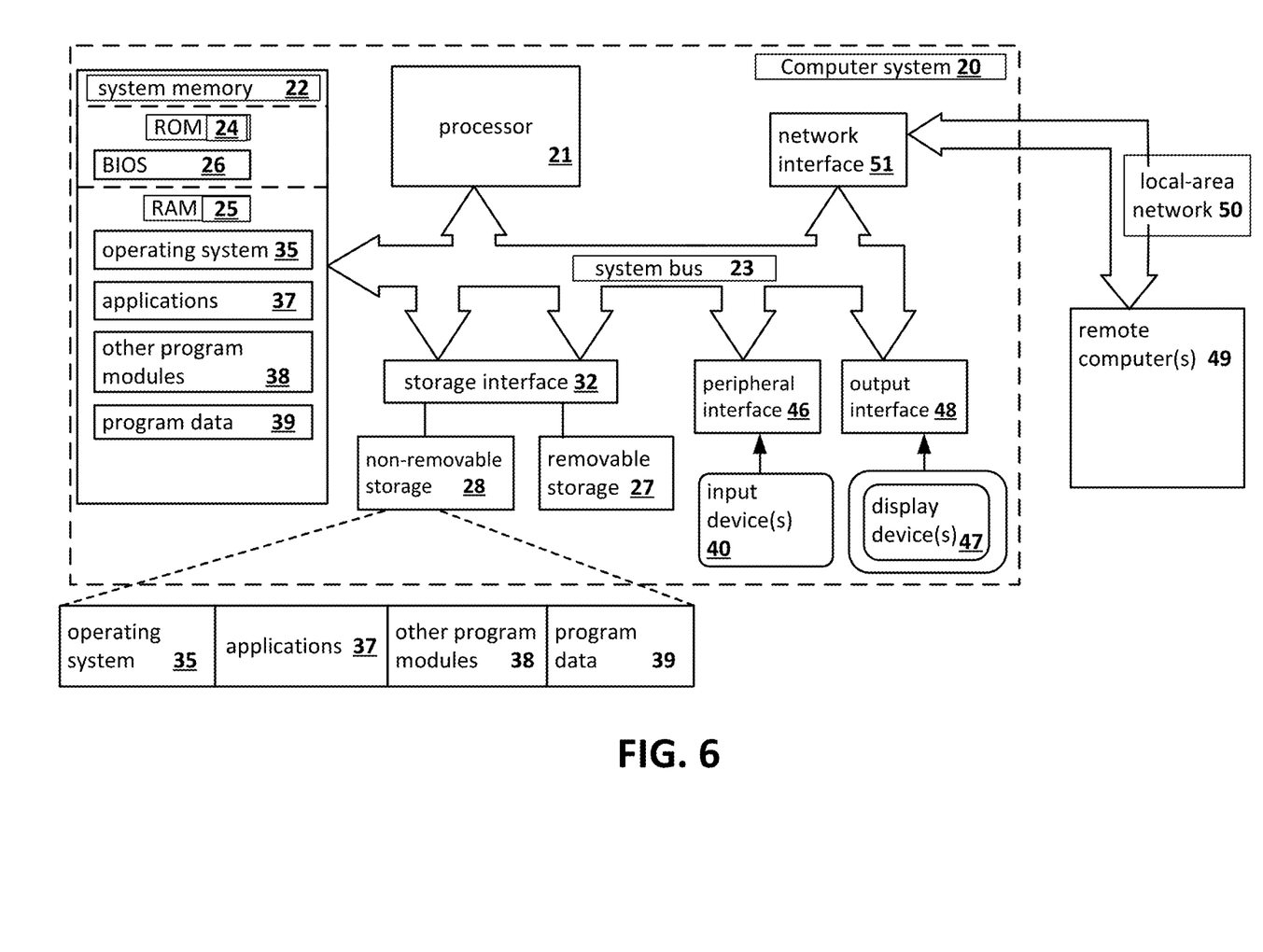
FIG. 6 presents an example of a general-purpose computer system on which aspects of the present disclosure can be implemented.

FIG. 6 is a block diagram illustrating a computer system 20 on which aspects of systems and methods for generating an intuitive network management user interface may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-5 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for generating an intuitive network management user interface (UI), the method comprising:
   receiving network information of at least one client network and at least one cloud network, wherein the network information includes a network identifier of each device within a given network, a status of the given network, network policies associated with the given network;
   determining a plurality of connections between the at least one client network and the at least one cloud network based on the network information;
   generating, for display, the network management UI comprising a three-column graphical structure wherein a first column includes first visualized information of the at least one client network, a second column includes second visualized information of the plurality of connections, and a third column includes third visualized information of the at least one cloud network;
   wherein the first visualized information and the third visualized information includes visualizations of the network information of at least one client network and at least one cloud network, and wherein the second visualized information includes lines, extending from the first column to the third column, that represent each network connection between a device in the at least one client network and a device in the at least one cloud network;
   receiving, on the network management UI, a selection to modify the at least one client network, the at least one cloud network, or the plurality of connections; and
   transmitting a command to the at least one client network and/or the at least one cloud network to execute the selection.

2. The method of claim 1, wherein receiving the network information comprises:
   installing, on the at least one client network and the at least one cloud network, at least one virtual agent configured to monitor internal and external network connections and generate the network information.

3. The method of claim 1, wherein the selection to modify comprises a selection to create a new network and reassign devices in an existing network of the at least one client network or the at least one cloud network to the new network.

4. The method of claim 1, wherein the selection to modify comprises creating a virtual private network (VPN) tunnel, wherein the VPN tunnel is associated with one of site-to-site open VPN and multi-site IPsec VPN.

5. The method of claim 1, wherein the selection to modify comprises performing automatic network mapping, wherein when a network is created on the at least one client network with an IP address that corresponds to the at least one cloud network, the command comprises automatically performing tunneling.

6. The method of claim 1, wherein the selection to modify comprises adding a virtual network to the at least one cloud network and stretching the virtual network to the at least one client network.

7. The method of claim 1, wherein the selection to modify comprises changing a parameter in one of the first visualized information, the second visualized information, and the third visualization information.

8. The method of claim 1, further comprising:
   generating an icon on each of the lines of the second column, wherein the icon indicates a status of a respective connection between a device in the at least one client network and a device in the at least one cloud network;
   receiving a selection of a first icon in the second column; and
   generating a dialog window that indicates additional information about a first connection associated with the first icon.

9. The method of claim 8, wherein an appearance of the icon differs based on whether the respective connection is successful or has errors.

10. The method of claim 1, wherein the second visualized information includes an icon that indicates an amount of the network policies that are active for a given connection.

11. A system for generating an intuitive network management user interface (UI), the system comprising:
at least one memory; and
at least one hardware processor coupled with the at least one memory and configured, individually or in combination, to:
receive network information of at least one client network and at least one cloud network, wherein the network information includes a network identifier of each device within a given network, a status of the given network, network policies associated with the given network;
determine a plurality of connections between the at least one client network and the at least one cloud network based on the network information;
generate, for display, the network management UI comprising a three-column graphical structure wherein a first column includes first visualized information of the at least one client network, a second column includes second visualized information of the plurality of connections, and a third column includes third visualized information of the at least one cloud network;
wherein the first visualized information and the third visualized information includes visualizations of the network information of at least one client network and at least one cloud network, and wherein the second visualized information includes lines, extending from the first column to the third column, that represent each network connection between a device in the at least one client network and a device in the at least one cloud network;
receive, on the network management UI, a selection to modify the at least one client network, the at least one cloud network, or the plurality of connections; and
transmit a command to the at least one client network and/or the at least one cloud network to execute the selection.

12. The system of claim 11, wherein the at least one hardware processor is configured to receive the network information by:
installing, on the at least one client network and the at least one cloud network, at least one virtual agent configured to monitor internal and external network connections and generate the network information.

13. The system of claim 11, wherein the selection to modify comprises a selection to create a new network and reassign devices in an existing network of the at least one client network or the at least one cloud network to the new network.

14. The system of claim 11, wherein the selection to modify comprises creating a virtual private network (VPN) tunnel, wherein the VPN tunnel is associated with one of site-to-site open VPN and multi-site IPsec VPN.

15. The system of claim 11, wherein the selection to modify comprises performing automatic network mapping, wherein when a network is created on the at least one client network with an IP address that corresponds to the at least one cloud network, the command comprises automatically performing tunneling.

16. The system of claim 11, wherein the selection to modify comprises adding a virtual network to the at least one cloud network and stretching the virtual network to the at least one client network.

17. The system of claim 11, wherein the selection to modify comprises changing a parameter in one of the first visualized information, the second visualized information, and the third visualization information.

18. The system of claim 11, wherein the at least one hardware processor is configured to:
generate an icon on each of the lines of the second column, wherein the icon indicates a status of a respective connection between a device in the at least one client network and a device in the at least one cloud network;
receive a selection of a first icon in the second column; and
generate a dialog window that indicates additional information about a first connection associated with the first icon.

19. The system of claim 18, wherein an appearance of the icon differs based on whether the respective connection is successful or has errors.

20. A non-transitory computer readable medium storing thereon computer executable instructions for generating an intuitive network management user interface (UI), including instructions for:
receiving network information of at least one client network and at least one cloud network, wherein the network information includes a network identifier of each device within a given network, a status of the given network, network policies associated with the given network;
determining a plurality of connections between the at least one client network and the at least one cloud network based on the network information;
generating, for display, the network management UI comprising a three-column graphical structure wherein a first column includes first visualized information of the at least one client network, a second column includes second visualized information of the plurality of connections, and a third column includes third visualized information of the at least one cloud network;
wherein the first visualized information and the third visualized information includes visualizations of the network information of at least one client network and at least one cloud network, and wherein the second visualized information includes lines, extending from the first column to the third column, that represent each network connection between a device in the at least one client network and a device in the at least one cloud network;
receiving, on the network management UI, a selection to modify the at least one client network, the at least one cloud network, or the plurality of connections; and
transmitting a command to the at least one client network and/or the at least one cloud network to execute the selection.

* * * * *